United States Patent
Verde Preckler et al.

(10) Patent No.: US 8,152,097 B2
(45) Date of Patent: Apr. 10, 2012

(54) STABILIZING AND DIRECTIONAL-CONTROL SURFACE OF AIRCRAFT

(75) Inventors: Jorge Pablo Verde Preckler, Madrid (ES); Jose Miguel Vizarro Toribio, Madrid (ES)

(73) Assignee: Airbus Operations S.L., Madrid (ES)

( * ) Notice: Subject to any disclaimer, the term of this patent is extended or adjusted under 35 U.S.C. 154(b) by 454 days.

(21) Appl. No.: 12/415,485

(22) Filed: Mar. 31, 2009

(65) Prior Publication Data

US 2009/0256025 A1     Oct. 15, 2009

(30) Foreign Application Priority Data

Dec. 4, 2008 (ES) .................................. 200803447

(51) Int. Cl.
   *B64C 9/00* (2006.01)
(52) U.S. Cl. ............. 244/87; 244/88; 244/91; 244/99.2
(58) Field of Classification Search ................ 244/218, 244/87, 88, 91, 99.2, 99.3, 89, 90 R, 213–216
   See application file for complete search history.

(56) References Cited

U.S. PATENT DOCUMENTS

| | | | |
|---|---|---|---|
| 1,574,567 A * | 2/1926 | Flettner | 244/82 |
| 2,398,710 A * | 4/1946 | King | 244/113 |
| 2,431,449 A * | 11/1947 | Ashkenas et al. | 244/87 |
| 2,643,833 A | 6/1953 | Ambroise | |
| 2,941,752 A | 6/1960 | Gluhareff | |
| 4,132,375 A | 1/1979 | Lamar | |
| 4,144,057 A | 3/1979 | Melton et al. | |
| 4,411,711 A | 10/1983 | Albrecht et al. | |
| 4,563,970 A * | 1/1986 | Walker | 114/102.22 |
| 5,127,605 A * | 7/1992 | Atchison et al. | 244/3.27 |
| 5,375,793 A | 12/1994 | Rivron et al. | |
| 5,440,193 A | 8/1995 | Barrett | |
| 5,681,010 A | 10/1997 | Jensen | |
| 6,574,958 B1 | 6/2003 | MacGregor | |
| 7,017,345 B2 | 3/2006 | Von Behrens et al. | |
| 2006/0284022 A1 | 12/2006 | Harrigan et al. | |
| 2007/0102587 A1 | 5/2007 | Jones et al. | |
| 2010/0032519 A1 * | 2/2010 | Chareyre et al. | 244/87 |

FOREIGN PATENT DOCUMENTS

FR    2911113 A1 *    7/2008
WO    WO 03/016133     2/2003

* cited by examiner

*Primary Examiner* — Timothy D Collins
*Assistant Examiner* — Jamie S Stehle
(74) *Attorney, Agent, or Firm* — Oblon, Spivak, McClelland, Maier & Neustadt, L.L.P.

(57) ABSTRACT

A stabilizing and directional-control surface of an aircraft includes a vertical stabilizer and a rudder that deflects relative to the vertical stabilizer. The rudder includes an internal profile that is extendable and retractable by an actuating system. An aerodynamic control surface area of the rudder is increased when the internal profile of the rudder is extended as compared to the aerodynamic control surface area of the rudder when the internal profile of the rudder is retracted.

14 Claims, 8 Drawing Sheets

STABILIZING AND DIRECTIONAL-CONTROL SURFACE OF AIRCRAFT

FIELD OF THE INVENTION

The present invention relates to a stabilizing and directional-control surface of aircraft, capable of stabilizing and controlling the direction of the aircraft when the latter is subjected in particular to unexpected strong yawing moments.

BACKGROUND OF THE INVENTION

Aircraft surfaces that provide stability and directional control of the aircraft are well known and have been extensively investigated. Fundamental among these are the vertical stabilizer and the rudder. The vertical stabilizer ensures that the nose of the aeroplane is oriented in the direction of flight, and the rudder opposes the yawing moments acting upon the aircraft, when the lateral direction of flight of said aircraft is being controlled.

The size and the operational power of the rudder are determined by, in addition to the aerodynamic requirements for the aircraft, several other factors intrinsic to the aircraft, for example if a fault develops in one of its power plants, and moreover this factor is decisive for the certification of the aircraft by the relevant authorities, for which sufficient control is required for specified speeds and conditions, both on the ground and in flight, for the concrete case of failure of one of the power plants of the aircraft.

The problem of directional control in case of failure of one of the power plants in large aircraft for civil aviation is discussed in various documents, for example in document U.S. Pat. No. 5,375,793. In said document it is stated that, in the majority of cases, it is the pilot who performs the appropriate deflections of the wing control surfaces (in the case when they are justified) during the critical moment of loss of one of the power plants of the aircraft. As described in said document, this manoeuvre is only justified on condition that the aircraft has a tendency to leave its lateral stability, which does not occur in a great many aircraft, so that in these cases the pilot only relies on the maximum deflection of the rudder as an alternative for opposing the yawing moment on the aircraft arising from the failure of one of its power plants.

In this connection, the industry has resorted to increasing the number of aerodynamic control surfaces provided on the wings, for example ailerons, flaps, spoilers and slats, or else has resorted to improving the efficiency of said surfaces. The aim is to improve the lateral-directional dynamic stability of the aircraft by operating said surfaces by means of automatic controls. As a result of this process, during takeoff of an aircraft with engine problems or a cross-wind, which would correspond to situations that would involve a very high yawing moment, with the aircraft speed being low and with very high moments acting on it, due to a fault in a power plant or to the existence of external situations such as a strong cross-wind, the efficiency in yaw of the aerodynamic surfaces is increased automatically by, for example, the application by the pilot of a maximum deflection on the rudder.

The problems that arise in the known solutions of this type relate to the increase in complexity of the structure of the aircraft and of its flight control systems. This gives rise to an increase in weight and increased drag of the aircraft, which leads to an increase in fuel consumption and noise.

The minimum control speed for an aircraft at takeoff is that for which, when a fault occurs in one of its power plants, the pilot is capable of maintaining control of the aircraft by means of deflection of the rudder as a single operation, that is, without this action requiring extraordinary piloting skill. This speed is closely related to the length of the takeoff runway. That is, the vertical stabilizer of an aircraft will be designed so that, at takeoff, if the aeroplane has exceeded its minimum control speed and a power plant fails, its aerodynamic surface in combination with operation of the rudder can absorb the yawing moment acting on the aircraft in consequence of the asymmetrical thrust to which it is submitted, maintaining the directional stability that is necessary for performing a successful takeoff manoeuvre. Below this minimum control speed the aeroplane must fulfil the requirement of being capable of performing a successful braking manoeuvre, i.e. within the length of the runway and complying with all standards relating to passenger safety.

Taking the foregoing into account, it is desirable for the minimum control speed to be as low as possible, so that the aeroplane can operate on shorter runways. To have lower minimum control speeds implies that the surface area of the vertical stabilizer and the surface area and power of the rudder should be greater, which means a penalty in weight and drag, as well as increasing the costs of manufacture, the resultant weight of the structure and the fuel cost in flight. The present invention overcomes these drawbacks, so that it provides greater rudder area in case of engine failure while maintaining the minimum area for the requirements of airworthiness of the aircraft in other flight conditions and regimes, and therefore without producing a penalty in increased drag and consequent increase in fuel cost and of efficiency in the thrust of the power plants.

As has already been explained, several inventions have been developed that aim to reduce the size of the vertical stabilizer and maintain the characteristics of directional control of the aircraft by increasing the aerodynamic control surfaces of the wings, as for example in documents WO 03/016133 A1, US 2007/0102587, U.S. Pat. No. 4,132,375 or in the aforementioned document U.S. Pat. No. 5,375,793. Solutions of this type increase the complexity of the control systems of the aeroplane and limit the crew's capacity for reaction and piloting to the maximum deflection of the rudder, an inadequate manoeuvre unless it is coupled with activation of the systems described. Conversely, the use of spoilers or ailerons (aerodynamic surfaces of the wings) can create a rolling moment on the aircraft, which will be controlled by the use of other surfaces, which will give rise either to an unnecessary increase in work load for the pilot, or to greater complexity of the automatic systems for flight control. That is, increase of the aerodynamic control surfaces on the wing leads to increased drag and therefore reduces the thrust capability of the engines, i.e. the aeroplane's ability to accelerate at a critical moment when this characteristic can prove decisive. Another drawback of having more aerodynamic surfaces on the aircraft is that their actuation results in a considerable increase in noise. Problems of the type described can increase exponentially if, as mentioned in document US 2006/0284022, we extend the use of these aerodynamic surfaces to other elements of the aircraft, such as the fuselage or the tail unit.

Another advantage of the present invention relative to other existing solutions is its simplicity. There are many inventions (U.S. Pat. No. 2,643,833, U.S. Pat. No. 5,681,010, U.S. Pat. No. 2,941,752) that claim the concept of adjusting the area of the tail unit in relation to the flight phase of the aircraft, but they add a great quantity of mechanical elements to the structure, which leads to increased weight of the unit and therefore poorer energy efficiency, as well as various drawbacks, such as a penalty in the time for centring the aircraft.

The present invention aims to solve the drawbacks mentioned above.

SUMMARY OF THE INVENTION

The present invention relates to a technical solution that improves, especially at takeoff (very low aircraft speeds) but also in the other phases of flight, the behaviour of an aircraft when it is acted upon by an unexpected yawing moment through causes intrinsic to the aeroplane such as failure of one of its engines, although this yawing moment may also be due to unbalanced transport of external loads or may arise from factors external to the aircraft, for example cross-wind or flooding of part of the takeoff runway.

Thus, the aim of the invention is to reduce the area of the stabilizing and directional-control surface of aircraft, comprising a vertical stabilizer and a rudder, specifically reduction of the surface area of the vertical stabilizer, without affecting the requirements of said stabilizing and directional-control surface as a control surface. The invention achieves this aim by means of a stabilizing and directional-control surface in which basically the surface area of the rudder is adjusted at takeoff of the aircraft and in conditions in which the aeroplane is subjected to a strong yawing moment as a consequence of failure of one of its power plants, or resulting from the transport of external loads, from flooding of part of the takeoff runway or from the effects of a cross-wind, among others.

One of the advantages of the invention is its simplicity of application for aircraft for civil use that are currently available, as well as the fact that it has little effect on the other aerodynamic surfaces of the aircraft, both in its use and in automation of its control.

The invention achieves the aforementioned aims by means of a stabilizing and directional-control surface, said surface comprising a vertical stabilizer and a rudder, such that the rudder can be deflected relative to the structure of the vertical stabilizer, and in its turn said rudder comprises an internal profile that can be extended relative to the structure of the rudder proper, and in its turn the structure of the rudder can open so as to permit extension of its internal profile, said structure closing once the internal profile has been extracted completely, so that the rudder, whether in its extended or retracted configuration, preserves its properties of aerodynamic surface and continuity of flow. The stabilizing and directional-control surface of the aircraft comprises:

- a deflecting system that permits the rudder to be deflected relative to the vertical stabilizer, said deflecting system being, on the one hand, anchored to the structure of the vertical stabilizer and, on the other hand, caught on the rudder;
- an actuating system that permits movement of the internal profile of the rudder in the longitudinal direction of said rudder, thus permitting the extension of the rudder along its longitudinal axis, said actuating system being anchored on the one hand on the structure proper of the rudder and, on the other hand, hooked to the internal profile of the rudder;
- an actuating system of the structure proper of the rudder, which permits said rudder to open and thus permits subsequent extension of the internal profile thereof, as well as the subsequent closure of the structure of the rudder once the internal profile has been retracted.

With said configuration it is possible to increase the aerodynamic control surface of the stabilizing and directional-control surface for requirements of controllability of the aircraft at low speeds and against infrequent strong yawing moments due to causes intrinsic to the aircraft, such as failure of one of its power plants, or through causes external to the configuration of the aircraft, such as unbalance of weights through transport of cargo, the existence of strong cross-wind or flooding of part of the takeoff runway, at the same time achieving with said configuration, when the rudder is retracted, an optimum aerodynamic surface for normal flying conditions.

The present invention is thus based on reduction of the overdimensioning of the vertical stabilizer due to its requirement of controllability at low speeds and against strong yawing moments by means of a surface in which the rudder is extensible, achieving the aim of reducing the area of the tail unit without greatly increasing the real complexity of the structure or of the flight control systems, which gives rise to an effective reduction of weight and of drag, and therefore of fuel consumption and of noise.

Other characteristics and advantages of the present invention will become clear from the following detailed description of applications illustrating its object in relation to the accompanying drawings.

DETAILED DESCRIPTION OF THE INVENTION

Figure 1:
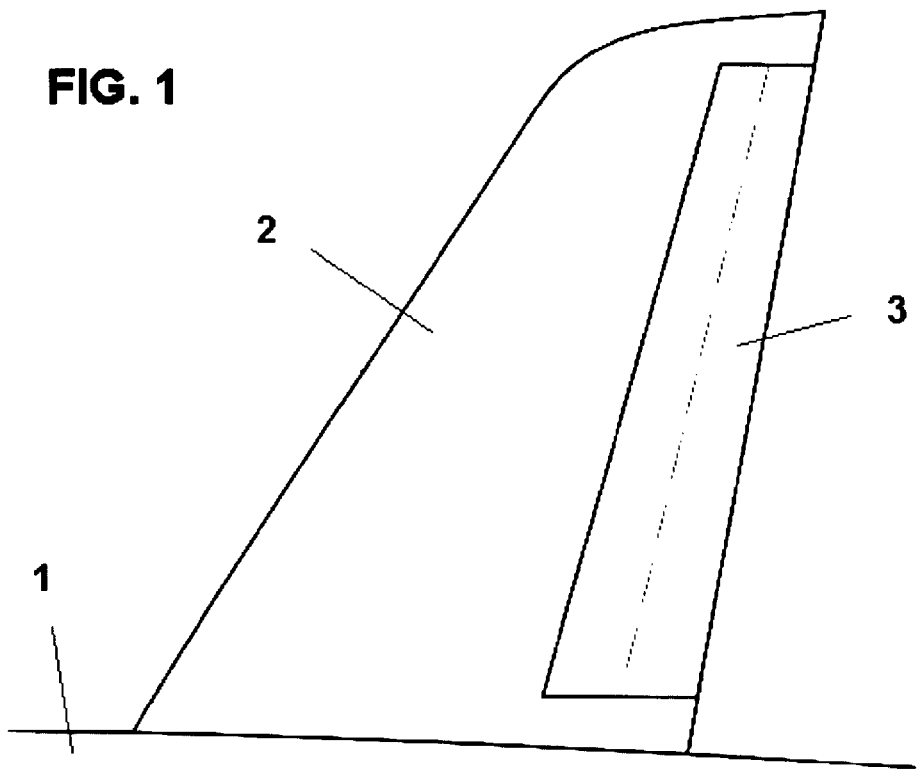
FIG. 1 shows a schematic sectional view of a stabilizing and directional-control surface with the rudder retracted relative to the vertical stabilizer, according to the present invention.

As can be seen in FIG. 1, which corresponds to a schematic sectional view of a stabilizing and directional-control surface, said surface comprises a vertical stabilizer 2 located in the rear portion of an aircraft 1, and a rudder 3. As is well known, the vertical stabilizer 2 gives the aircraft directional stability, whereas the rudder 3 provides lateral-directional control of said aircraft. Bearing in mind the influence of the stabilizing and directional-control surface on the airworthiness of an aeroplane, the design of a vertical stabilizer 2 of an aircraft is regarded as a decisive factor that will affect its final size: said factor arises from the possibility of development of a fault in one of the power plants of the aircraft, which will produce a strong yawing moment on the aircraft in question. The vertical stabilizer 2 and the power of deflection and actuation of the rudder 3 must provide the stability and directional control of the aircraft, which is directly related to the aerodynamic, and therefore dimensional, surface area of said vertical stabilizer 2 and of said rudder 3. In normal flying conditions, the requirements for these aerodynamic surfaces, fin 2 and rudder 3, will be lower, so that the vertical stabilizer 2 and the rudder 3 will be oversized with respect to these requirements.

Figure 2A:
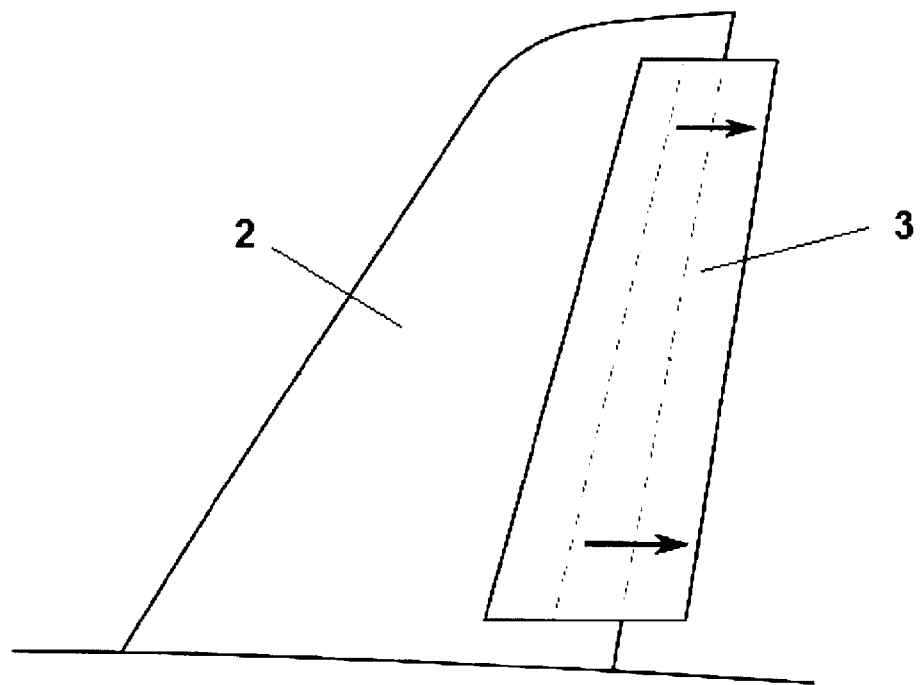
FIGS. 2a and 2b show a schematic sectional view of a stabilizing and directional-control surface with the rudder extended in two different ways, relative to the vertical stabilizer, according to the present invention.
Figure 2B:
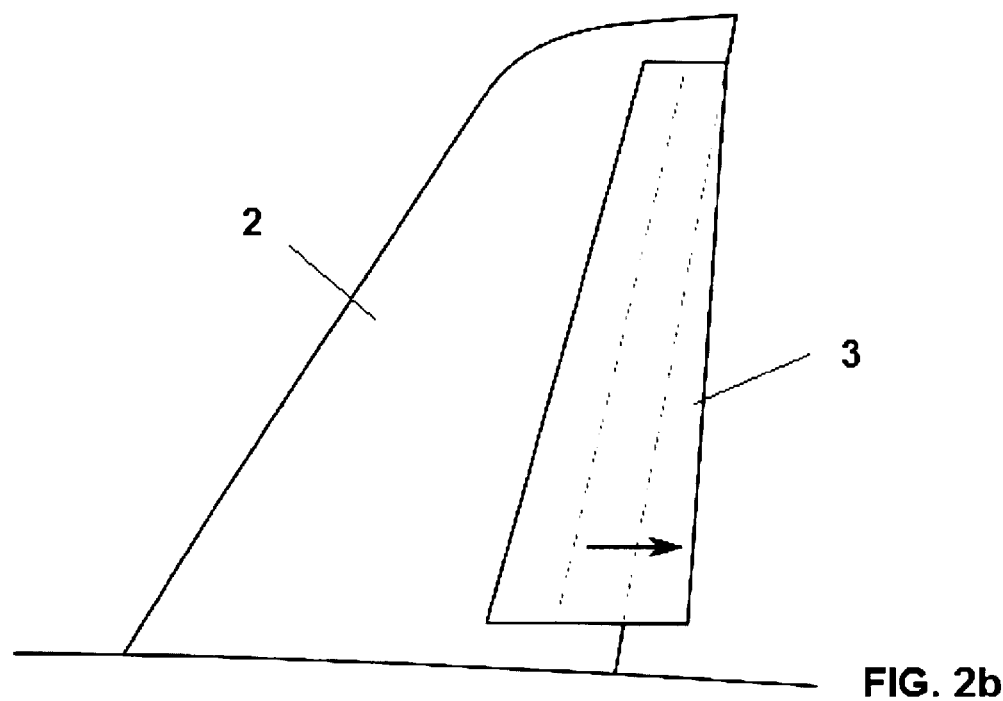

Thus, FIGS. 2a and 2b show a schematic sectional view of the vertical stabilizer 2 with the rudder 3 extended according to the present invention, i.e. with the aerodynamic requirements necessary for the case of failure of a power plant. FIG. 1 shows the rudder 3 retracted and therefore with the aerodynamic requirements sufficient for normal flying conditions. It must be pointed out that abnormally high yawing moments due to causes external to the aeroplane, such as strong sidewinds or flooding of part of the takeoff runway, or by internal causes of the aeroplane, such as unbalance of weights in transport of cargo, are also absorbed by means of the present invention. That is, it is ensured that the aircraft meets the necessary aerodynamic and control requirements, but with a vertical stabilizer 2 and rudder 3 of smaller surface area in normal flying conditions than a conventional aircraft, which implies reduced drag, better energy efficiency, as well as a reduction of noise pollution.

As can be seen in FIGS. 2a and 2b, two different illustrations of the extension of the rudder 3 relative to the vertical stabilizer 2 of an aircraft are presented, showing that the extension of said rudder 3 need not necessarily be completely parallel to the lateral plane of the rudder, nor need it be completely symmetrical.

Figure 3A:
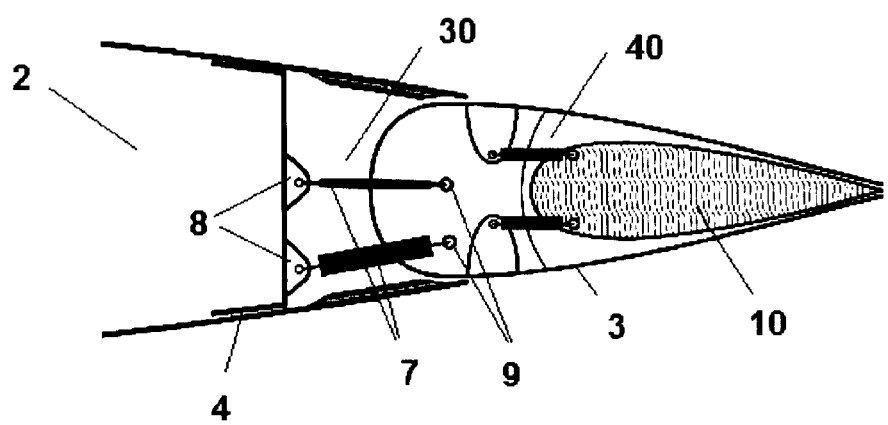
FIGS. 3a and 3b show a schematic top view of a stabilizing and directional-control surface with the rudder retracted, in a first embodiment of the present invention.
Figure 3B:
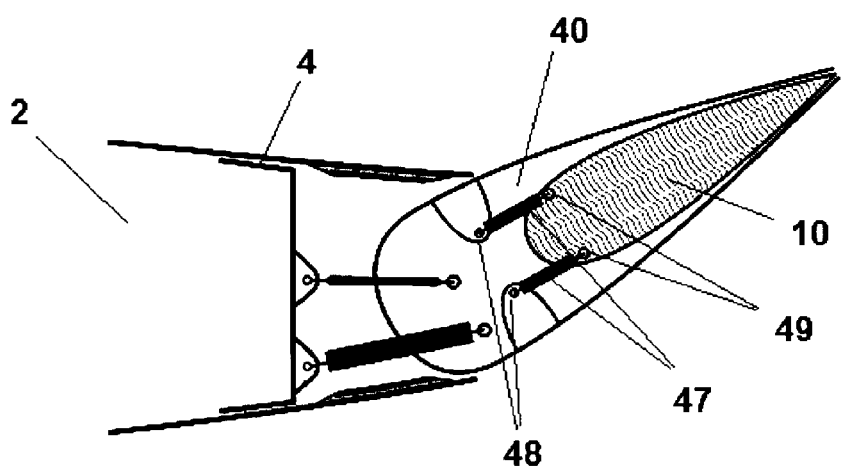

FIGS. 3a and 3b show two positions, in a schematic top view, of the rudder 3 of an aircraft, in retracted mode, according to a first embodiment of the present invention. The two positions of the rudder 3 in FIGS. 3a and 3b are: without being deflected (or deflection 0°) in FIG. 3a, and deflected in FIG. 3b. These figures also show part of the plan view of the vertical stabilizer 2 and of its torsion box-beam 4. The rudder 3 is anchored on the surface of the vertical stabilizer 2 in a conventional manner. Thus, we have a deflecting system 30 that comprises at least two actuators 7, with each actuator 7 anchored to the torsion box-beam 4 of the vertical stabilizer 2 by means of a fitting of type 8, and to the rudder 3 by means of a catch 9. The deflecting system 30 provides the appropriate deflection of the rudder 3. Rudder 3 comprises in its turn an internal profile 10, a fundamental structure for increasing the aerodynamic surface area on extension of the rudder 3.

Figure 4A:
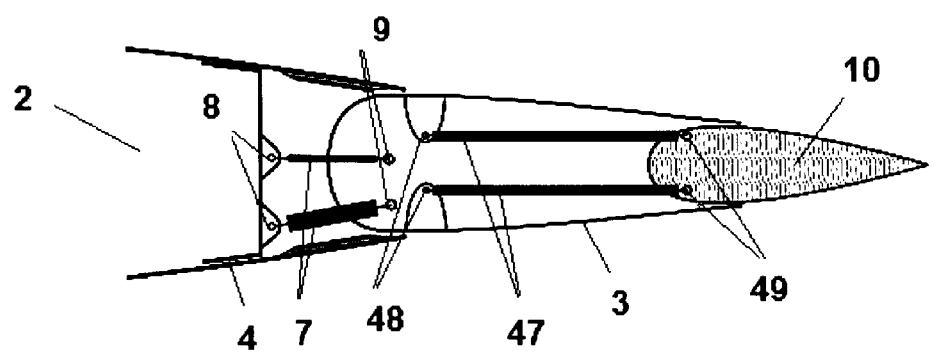
FIGS. 4a and 4b show a schematic top view of a stabilizing and directional-control surface with the rudder extended, in a first embodiment of the present invention.
Figure 4B:
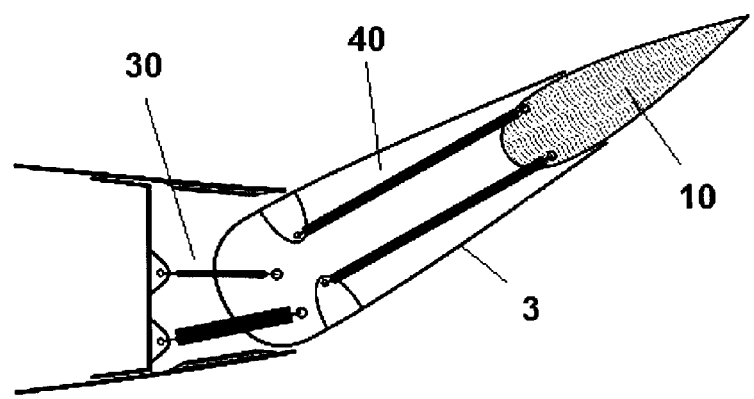

FIGS. 4a and 4b show two positions, in a schematic top view, of the rudder 3 of an aircraft in its extended mode, according to a first embodiment of the present invention (FIGS. 3a and 3b). Just as in FIGS. 3a and 3b, the two positions of the rudder 3 in FIGS. 4a and 4b are: without deflection (FIG. 4a), and deflected (FIG. 4b). The first embodiment of the present invention can also be seen accurately in said FIGS. 4a and 4b. The internal profile 10 of the rudder 3 is guided, fixed to the structure of the rudder 3 and controlled by means of an actuating system 40. The actuating system 40 comprises at least one actuator 47, although preferably it will have two actuators 47, each actuator 47 being anchored to the structure of the rudder 3 by means of a fitting 48, and to the internal profile 10 of the rudder 3 by means of a catch 49.

Therefore, as is clear from FIGS. 3a, 3b, 4a and 4b, which correspond to a first embodiment of the invention, the rudder 3 will be deflected in a conventional manner by means of the deflecting system 30. In normal flying conditions, we will have a rudder 3 like that shown in FIGS. 3a and 3b, with the difference that its aerodynamic surface area will be less than a conventional rudder would have, thus reducing the drag to which the structure of the stabilizing and directional-control surface is subject, and improving its energy efficiency. If there are strong yawing moments caused by adverse circumstances that are unscheduled and infrequent, such as the failure of one of the power plants of the aircraft, the internal profile 10 of the rudder 3 is deflected by means of the actuating system 40, as shown in FIGS. 4a and 4b, so that the required aerodynamic surface for directional control is provided. When the flying conditions become stable again, the internal profile 10 of rudder 3 can be retracted and flight can continue. The maintenance of the internal structure of rudder 3 will be similar to the deflection zone of said rudder 3, with hardly any increase in costs associated with this operation.

Figure 5A:
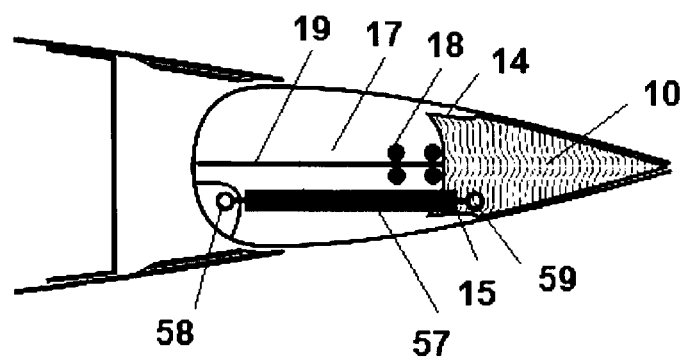
FIGS. 5a and 5b show a schematic top view of a stabilizing and directional-control surface with the rudder retracted and extended, respectively, in a second embodiment of the present invention.
Figure 5B:
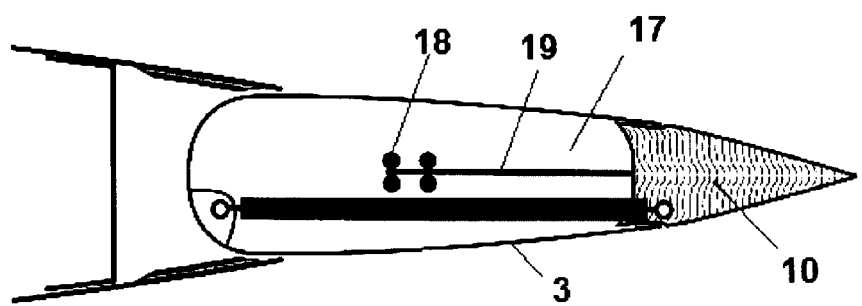

FIGS. 5a and 5b show two positions, in a schematic top view, of the rudder 3 of an aircraft according to a second embodiment of the present invention. The two positions of the rudder 3 in FIGS. 5a and 5b are: with the internal profile 10 retracted (FIG. 5a) and with the internal profile 10 extended (FIG. 5b). In this second embodiment of the invention, the form of the internal profile 10 of the rudder 3 has been modified, so that with this configuration it is possible to reduce the weight of the structure while at the same time maintaining its required aerodynamic characteristics and anchoring characteristics. The internal profile 10 according to this second embodiment will in addition have two symmetrical grooves 14 and 15 in its surface that will help to maintain the continuity of flow on rudder 3 when the latter is in its extended mode. This new form of the internal profile 10 according to the second embodiment could also be used in the first embodiment mentioned above.

It should be noted that FIGS. 5a and 5b, as well as the figures corresponding to the third and fourth embodiments of the invention, do not show, for simplicity, the deflecting system 30 of the rudder 3 (since it is moreover a conventional deflecting system).

As can be seen in FIGS. 5a and 5b, corresponding to a second embodiment of the present invention, it comprises an actuating system 40 for the extension and retraction of the internal profile 10 of the rudder 3 that comprises at least one actuator 57, said actuator 57 being anchored to the structure of the rudder 3 by means of a fitting of type 58, and to the internal profile 10 of the rudder 3 by means of a catch 59. By means of the aforementioned actuating system 40, it is possible to extend and retract the internal profile 10 and therefore increase or reduce the aerodynamic surface of the rudder 3 in relation to the circumstances explained previously.

This second embodiment of the invention (FIGS. 5a and 5b) further incorporates a guidance system 17 which guides the movement of the internal profile 10 of the rudder 3. The guidance system 17 comprises a system of bearings 18 and a bar 19. The bar 19 is connected to the internal profile 10, so that when the actuating system 40 induces a translational motion on the internal profile 10 of the rudder 3, the motion of said profile 10 is guided by system 17. The system of bearings 18 allows a single motion, along the longitudinal axis of rudder 3, of the bar 19 and therefore of the internal profile 10. The use of this guidance system 17 means it is not necessary to have at least two actuators 7 (first embodiment), and ensures correct motion of the bar 19 and therefore of the internal profile 10 in conditions with requirements of high aerodynamic loads on the rudder 3, owing to the system of bearings 18.

Figure 6A:
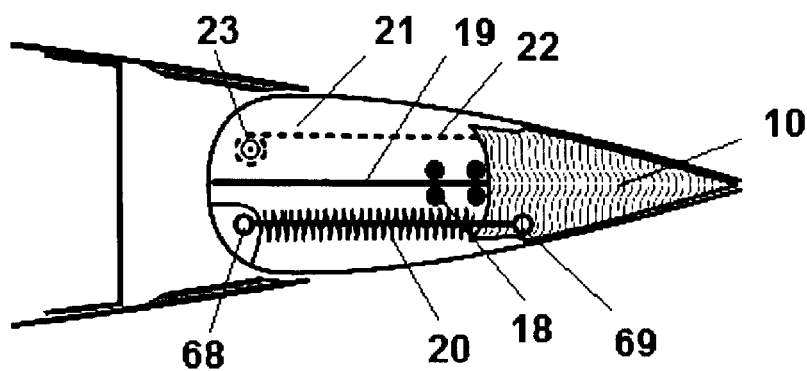
FIGS. 6a and 6b show a schematic top view of a stabilizing and directional-control surface with the rudder retracted and extended, respectively, in a third embodiment of the present invention.
Figure 6B:
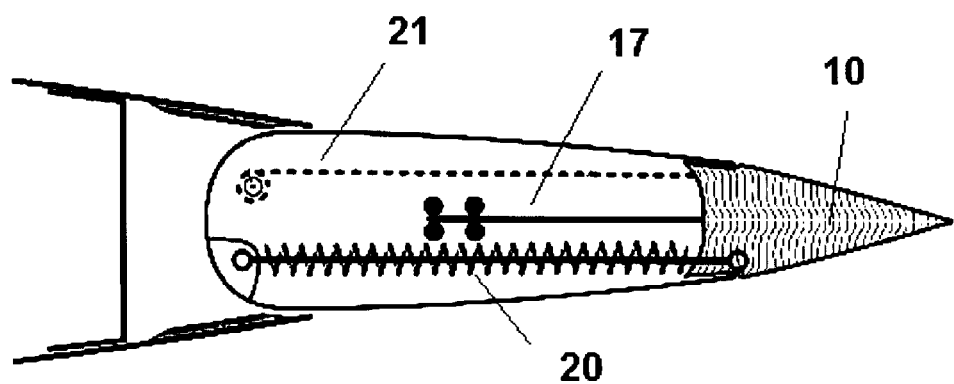

FIGS. 6*a* and 6*b* show two positions, in a schematic top view, of the rudder 3 of an aircraft according to a third embodiment of the present invention. The two positions of the rudder 3 in FIGS. 6*a* and 6*b* are: with the internal profile 10 retracted (FIG. 6*a*), and with the internal profile 10 extended (FIG. 6*b*). The actuating system 40 of the internal profile 10 is different in this embodiment from that shown previously. This third embodiment keeps the guidance system 17 that guides the motion of the internal profile 10 and comprises a system of bearings 18 and a bar 19, but replaces the actuating system 40 with a doble device that comprises an elastic device 20 (typically a spring) and a cable-controlled movement system 21.

The elastic system 20 is anchored to the rudder 3 by means of a fitting 68 and to the internal profile 10 by means of a catch 69. The elastic system 20 will typically be a compression spring. Both the fitting 68 and the catch 69 are similar to those described for the first embodiment, having the purpose of anchoring the actuating system 40 to the torsion box-beam 4 of the vertical stabilizer 2 and to the rudder 3, respectively.

The cable-controlled movement system 21 comprises a cable 22 connected to the structure of the internal profile 10 and a motor 23 with cable take-up system that is anchored to the internal structure of the rudder 3. The motor 23 with cable take-up system permits complete, controlled release of the cable 22 when actuated.

Thus, the operation of FIGS. 6*a* and 6*b* corresponding to the third embodiment of the invention will consist of extension and retraction of the rudder 3 by means of the elastic system 20 and the cable-controlled movement system 21, aided by the guidance system 17. In this way, when it is necessary to extend the rudder 3 of the vertical stabilizer 2 based on the flight requirements, the movement of the cable 22 will be released in the motor 23, so that the elastic system 20 will be activated and will produce a fast movement of the internal profile 10, but moreover a movement that is controlled by the guidance system 17, with the result that the rudder 3 assumes its extended configuration. When the flying conditions permit the area of the vertical stabilizer 2 to be reduced, the internal profile 10 will be retracted by take-up of the cable 22, through actuation of motor 23. Both the movement of extension and that of retraction of the internal profile 10 of the rudder 3 will be controlled by the guidance system 17, which will permit suitable displacement of the rudder 3 even in conditions of high aerodynamic loads on the structure of the vertical stabilizer 2.

Figure 7A:
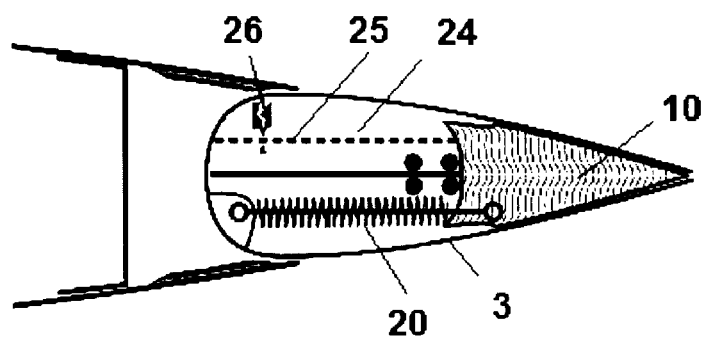
FIGS. 7a and 7b show a schematic top view of a stabilizing and directional-control surface with the rudder retracted and extended, respectively, in a fourth embodiment of the present invention.
Figure 7B:
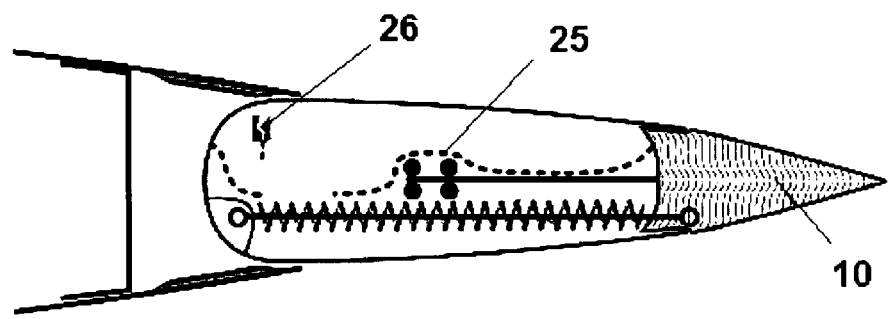

FIGS. 7*a* and 7*b* show two positions, in a schematic top view, of the rudder 3 of an aircraft according to a fourth embodiment of the present invention. The two positions of the rudder 3 in FIGS. 7*a* and 7*b* are: with the internal profile 10 retracted (FIG. 7*a*), and with the internal profile 10 extended (FIG. 7*b*). The actuating system 40 of the internal profile 10 differs in this embodiment from that shown previously: this embodiment retains the guidance system 17, as well as the elastic system 20 (typically a spring), whose operation has already been described, but the cable-controlled movement system 21 is replaced with a pyrotechnic cable-breaking device 24. The elastic system 20 is anchored to the rudder 3 and to the internal profile 10, and is typically a compression spring.

The pyrotechnic cable-breaking device 24 comprises a pyrotechnic breaking cable 25 and a pyrotechnic system 26.

The pyrotechnic device 24 is for a unique use, and must be replaced at the next maintenance operation on the aircraft if breakage of cable 25 occurs.

The operation described in FIGS. 7*a* and 7*b* corresponding to the fourth embodiment of the invention will consist of extension of the internal profile 10 of the rudder 3 by means of the elastic system 20 and the pyrotechnic cable-breaking device 24 aided by the guidance system 17. In this way, when it is necessary to extend the rudder 3 of the vertical stabilizer 2 based on the flight requirements, the pyrotechnic system 26 will be activated, causing breakage of the cable 25 so that the elastic system 20 will be activated and will cause a very rapid movement of the internal profile 10 controlled by the guidance system 17 that will enable the rudder 3 to assume its extended configuration.

The fourth embodiment of the invention described in FIGS. 7*a* and 7*b* shows the use of an actuating system 40 of the rudder 3 without possibility of retraction until the next maintenance operation. The reason why this device is single-use resides in the exceptional circumstance of needing to increase the surface area of the vertical stabilizer 2 of an aircraft extremely quickly. When an exceptional situation arises, such as the unlikely failure of one of the power plants or a strong yawing moment due to transport of cargo or through strong cross-winds or flooding of part of the takeoff runway, the aforesaid single-use device 40 for extending the rudder 3 will be actuated. Once said device 40 has actuated, the pilot will have a suitable aerodynamic surface of rudder 3 to continue in normal flying conditions, by operating the rudder and with control by the flight instruments. It should also be emphasized that the fact that the device acts by breaking the cable means that the movement of extension of the rudder 3 is quicker, a very important characteristic in critical flying conditions.

The fact that, when the flight requirements are restabilized at normal levels, the rudder 3 is then oversized, has absolutely no effect on flight safety or viability; uniquely and, as happens in existing commercial aircraft designed according to control requirements, this oversizing will imply increased drag that will mean an increase in the fuel cost. In contrast, use of a configuration such as that of the fourth embodiment of the invention shown in FIGS. 7*a* and 7*b* is associated with a number of advantages during the remaining hours of flight of the aeroplane, which mean the vast majority of the total. These advantages can be summarized in two fundamental benefits: the system of the invention is simpler both in use and maintenance and therefore more reliable, and is moreover lighter in weight than that presented in the previous embodiments of the present invention.

For the reasons stated, this fourth embodiment of the invention is basically directed at fulfilling the requirements as a consequence of the failure of one of the power plants of the aircraft in any of its flight phases. As this is an exceptional circumstance, the actuating system will in this case be rapid, effective and single-use, requiring a maintenance operation for its reactivation once the aircraft is parked.

In all the previous embodiments, for deployment of the internal profile 10 of the rudder 3 to occur it is necessary for the actual structure of the rudder 3 to open, to permit said deployment. Once the internal profile 10 has been extended, the opened structure of the rudder 3 will close again, fitting together with the deployed internal profile 10, so that the rudder 3, with the profile 10 and together with the vertical stabilizer 2, constitute a single, integrated aerodynamic surface with continuity of flow that permits the directional control required for the aircraft.

This can be achieved in two different ways, either by using shape memory alloys (SMA) in the rudder 3, or by means of an actuating system 70 that will act on the structure of the rudder 3.

Thus, the type of structure used in the rudder 3 is to be defined so as to permit its adjustment and change of shape on the trailing edge when extension of the internal profile 10 is effected by means of any of the aforementioned embodiments. That is, the structure of the rudder 3 must adapt according to the position of the internal profile 10, maintaining its characteristics of aerodynamic surface, such as continuity of flow.

The first solution to this requirement of the rudder 3 for adapting to the surface of the internal profile 10 is the use of so-called shape memory alloys (SMA) for parts 79, 80 of the structure of the rudder 3. Documents are known in the prior art concerning alloys of this type: for reference, it can be stated that inventions relating to SMAs include those that describe the constituents and characteristics of said alloys from the standpoint of materials in document U.S. Pat. No. 4,144,057, and from the standpoint of structural application, in documents U.S. Pat. No. 5,440,193, U.S. Pat. No. 7,017,345, U.S. Pat. No. 4,411,711 or U.S. Pat. No. 6,574,958, among others.

The main characteristic that makes the SMAs applicable to the embodiments of the present invention is that alloys of this type recover their initial shape once the force deforming them ceases for a period of time. The position of rest of the structure of the rudder 3 (of parts 79, 80 of said rudder 3) and therefore of the SMA alloy used in their manufacture would correspond to the position of retraction of the rudder 3, shown in FIG. 1. That is, the structure of the rudder 3 would be in the position of rest for by far the greater part of the time of flight. If for infrequent, exceptional requirements it is necessary for the rudder 3, and specifically the internal profile 10 of said rudder 3 of the vertical stabilizer 2 to be extended in order to increase the lateral-directional aerodynamic control surface of the aircraft, any of the systems for actuation of the internal profile 10 of the rudder 3 described above would be activated, with the structure of the trailing edge of said rudder 3 adapting to the contour of the internal profile 10, maintaining the continuity of flow of the new aerodynamic structure formed. Once the conditions allow the internal profile 10 of the rudder 3 to be retracted again, the structure would adopt its initial position of rest (FIG. 1).

Figure 8A:
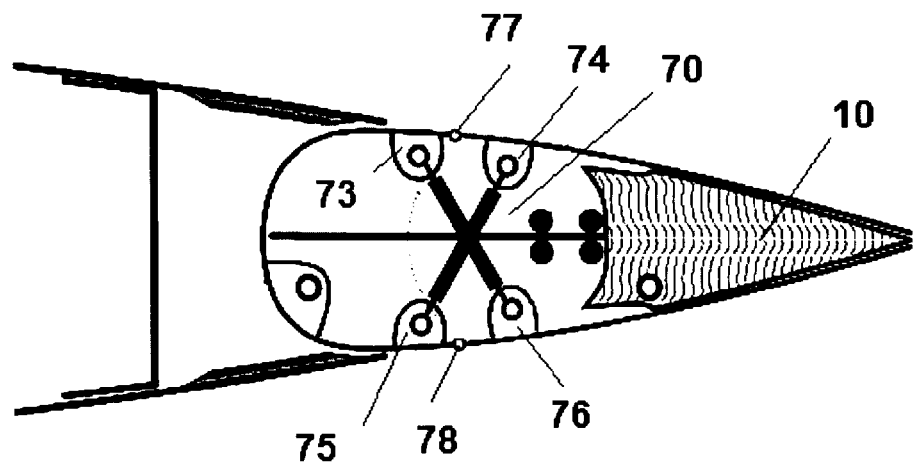
FIGS. 8a and 8b show a schematic top view of a stabilizing and directional-control surface, showing the actuating system of the structure of the rudder, according to the present invention.
Figure 8B:
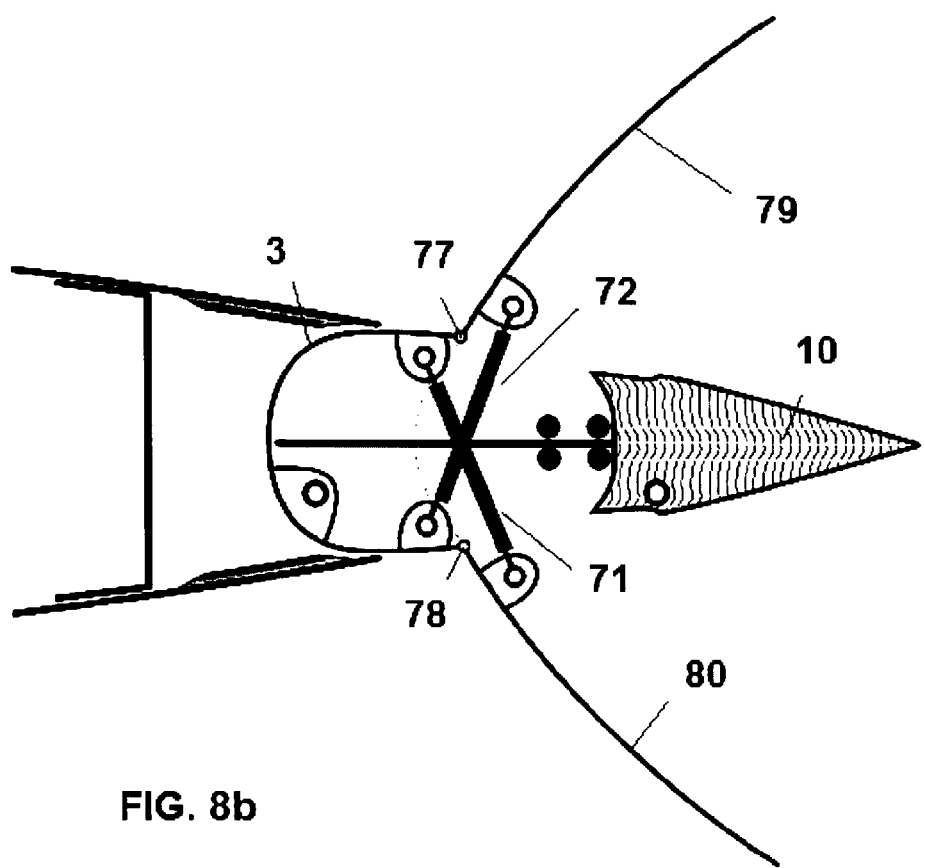

The second solution proposed for the requirement of adaptability of the surface of the rudder 3 is illustrated in FIGS. 8a and 8b.

FIGS. 8a and 8b show two positions, in a schematic top view, of this second structural solution for the rudder 3. The two positions of the rudder 3 in FIGS. 8a and 8b are: with the structure of the internal profile 10 of the rudder 3 retracted (FIG. 8a), and with the structure of the internal profile 10 of the rudder 3 prepared for the extended configuration (FIG. 8b). The system for actuating the internal profile 10 can be according to any of the four preferred embodiments mentioned above.

This second proposed structural solution consists of using a rudder 3 whose surface is divided along its longitudinal axis to approximately 75% of the geometric chord of the rudder 3 from the trailing edge of the retracted position. This will therefore give a surface of the rudder 3 with possibility of opening in its two parts 79, 80 for adapting to the internal profile 10 of the rudder 3 in its extended position, as depicted in FIG. 2. For accomplishing the structural opening directed at adaptation of the internal profile 10, an actuating system 70 will be used that comprises two actuators, 71 and 72, similar to the actuator 7 in FIG. 3a. These actuators 71 and 72 are accordingly anchored to the internal structure of the rudder 3 via catching points 73, 74, 75 and 76. The structure of the rudder 3 comprises two elements 77, 78, of the hinge type, which permit the opening and adaptation of the structure of the rudder 3 without affecting the continuity of flow, said elements 77, 78 being located at a distance of approximately 75% of the geometric chord of the rudder 3 from the trailing edge of the retracted position.

The operation of the aforementioned actuating device 70 thus consists of opening the structure of the rudder 3, specifically of its parts 79, 80, and their adaptation to the contour of the internal profile 10, when the extended configuration of the vertical stabilizer 2 is required, by activation of the actuators 71, 72, and according to the degree of freedom allowed by elements 77, 78 of the hinge type. Once the flying conditions permit, by activation of the actuators 71, 72, it returns to the retracted position of the internal profile 10 of the rudder 3 illustrated in FIG. 1. The above system thus provides two structural configurations of the rudder 3, maintaining the required aerodynamic characteristics and continuity of flow.

The two structural solutions proposed for fulfilling the requirements of adaptability of the surface of the rudder 3 are applicable to the four embodiments of the present invention described above. If we take into account the characteristics of the four embodiments presented, the first structural solution (use of SMA materials) is more applicable to the fourth embodiment of the present invention, i.e. in the system for extension of the internal profile described in FIGS. 7a and 7b, which we designate as single-use. The reason is that this system is simpler in maintenance requirements and its use is very limited to very exceptional situations. However, the second structural solution (by means of the actuating system 70 described in FIGS. 8a and 8b) is more applicable in the first three embodiments of the invention described in FIGS. 3a and 3b; 4a and 4b; 5a and 5b. This second structural solution facilitates the operations of maintenance with respect to the first solution described, making the operation in flight of extension-retraction of the internal profile 10 of the rudder 3 more feasible.

The modifications included within the scope defined by the following claims can be introduced in the embodiments that we have just described.

The invention claimed is:

1. A stabilizing and directional-control surface of an aircraft, comprising:
    a vertical stabilizer; and
    a rudder that deflects relative to the vertical stabilizer, the rudder including an internal profile that is extendable and retractable by an actuating system, wherein
    an aerodynamic control surface area of the rudder is increased when the internal profile of the rudder is extended as compared to the aerodynamic control surface area of the rudder when the internal profile of the rudder is retracted, and
    an outer surface of the rudder opens to permit the extension of the internal profile of the rudder and closes once the internal profile is fully extended.

2. The stabilizing and directional-control surface of an aircraft according to claim 1, wherein the internal profile is extendable and retractable by the actuating system in a direction of a longitudinal axis of the rudder.

3. The stabilizing and directional-control surface of an aircraft according to claim 1 or 2, wherein
    the rudder with the extended internal profile forms a structure that preserves the rudder's properties of aerodynamic surface and continuity of flow.

4. The stabilizing and directional-control surface of an aircraft according to claim 3, wherein the outer surface of the rudder is made of an alloy of a shape memory alloy (SMA) type.

5. The stabilizing and directional-control surface of an aircraft according to claim 3, wherein the outer surface of the rudder opens along its longitudinal axis to approximately 75% of a geometric chord of the rudder from a trailing edge of a retracted position thereof.

6. The stabilizing and directional-control surface of an aircraft according to claim 5, wherein the outer surface of the rudder includes two parts that open on a basis of rotation about two hinges, by way of two actuators.

7. The stabilizing and directional-control surface of an aircraft according to claim 1, wherein the actuating system includes at least one actuator anchored to the rudder by way of a fitting and to the internal profile of the rudder by way of a catch.

8. The stabilizing and directional-control surface of an aircraft according to claim 1, wherein the actuating system includes an elastic system.

9. The stabilizing and directional-control surface of an aircraft according to claim 1, further comprising a guidance system that guides longitudinal movement of the internal profile of the rudder to ensure correct movement of the internal profile in conditions that require aerodynamic loads on the rudder.

10. The stabilizing and directional-control surface of an aircraft according to claim 9, wherein
the guidance system includes a system of bearings and a bar, and
the bar is connected to the internal profile to guide the movement of the internal profile by the system of bearings to allow a single motion of the bar and the internal profile along a longitudinal axis of the rudder when the actuating system induces a translational motion on the internal profile.

11. The stabilizing and directional-control surface of an aircraft according to claim 1, wherein
the actuating system includes a cable-controlled movement system, and
the cable-controlled movement system includes a cable connected to the internal profile and a motor with a cable take-up system that is anchored to the rudder.

12. The stabilizing and directional-control surface of an aircraft according to claim 1, wherein
the actuating system includes a pyrotechnic system that includes a pyrotechnic device that breaks a pyrotechnic breaking cable connected between the internal profile and the rudder.

13. The stabilizing and directional-control surface of an aircraft according to claim 12, wherein the pyrotechnic system is single-use and required to be replaced following an activation of the actuating system.

14. The stabilizing and directional-control surface of an aircraft according to claim 1, wherein the internal profile includes two grooves in a surface thereof that help to maintain continuity of flow on the rudder when the internal profile is extended.

* * * * *